(12) United States Patent
Moore

(10) Patent No.: US 8,973,857 B2
(45) Date of Patent: Mar. 10, 2015

(54) INNOVATIVE RATCHETING SYSTEM

(75) Inventor: Hamilton Grant Moore, Decatur, AL (US)

(73) Assignee: Intitate Launch LLC, Decatur, AL (US)

( * ) Notice: Subject to any disclaimer, the term of this patent is extended or adjusted under 35 U.S.C. 154(b) by 180 days.

(21) Appl. No.: 13/342,145

(22) Filed: Jan. 2, 2012

(65) Prior Publication Data

US 2013/0168482 A1 Jul. 4, 2013

(51) Int. Cl.
    *B65H 75/48* (2006.01)
(52) U.S. Cl.
    USPC ............ 242/378; 242/378.1; 242/378.2; 242/378.3; 242/378.4
(58) Field of Classification Search
    USPC .................... 242/378, 378.1–378.4
    See application file for complete search history.

(56) References Cited

U.S. PATENT DOCUMENTS

| | | | |
|---|---|---|---|
| 1,276,825 A | | 8/1918 | Swope |
| 1,446,410 A | | 2/1923 | Boyd et al. |
| 1,737,978 A | | 12/1929 | Sebell |
| 1,865,069 A | | 6/1932 | Allen |
| 1,945,842 A | * | 2/1934 | Witchger ............... 33/767 |
| 1,958,626 A | | 5/1934 | Krantz |
| 2,172,043 A | * | 9/1939 | Wolf ............... 242/379 |
| 2,206,352 A | | 7/1940 | Hellmann |
| 2,211,561 A | | 8/1940 | Flannelly |
| 2,262,587 A | | 11/1941 | Kaempf |
| 2,678,779 A | | 5/1954 | Bellmer |
| 2,979,576 A | | 4/1961 | Huber |
| 3,061,234 A | | 10/1962 | Morey |
| 3,578,260 A | | 5/1971 | Kell |
| 3,584,157 A | | 6/1971 | Prescott |
| 3,657,491 A | | 4/1972 | Ryder et al. |
| 4,053,118 A | | 10/1977 | Aikins |
| 4,062,608 A | | 12/1977 | Pierce |
| 4,384,688 A | | 5/1983 | Smith |
| 4,472,010 A | | 9/1984 | Parnello |
| 4,543,806 A | | 10/1985 | Papandrea et al. |
| 4,646,987 A | | 3/1987 | Peterson |
| 4,757,955 A | * | 7/1988 | Simmons ............... 191/12.2 R |
| 5,014,437 A | * | 5/1991 | Sun ............... 33/414 |
| 5,094,396 A | | 3/1992 | Burke |
| 6,019,304 A | | 2/2000 | Skowronski et al. |
| 6,405,683 B1 | | 6/2002 | Walter et al. |
| 6,487,811 B2 | | 12/2002 | Barrett |
| 6,524,041 B1 | | 2/2003 | Voiculescu |
| 6,616,080 B1 | | 9/2003 | Edwards et al. |
| 7,147,177 B2 | * | 12/2006 | Yen ............... 242/385.4 |
| 7,494,083 B1 | * | 2/2009 | Yen ............... 242/378.1 |
| 7,966,912 B1 | | 6/2011 | Hobden et al. |

* cited by examiner

*Primary Examiner* — Sang Kim

(57) ABSTRACT

An innovative and advantageous ratcheting system having a housing, a corresponding ratcheting member, and a primary ratcheting member. Wherein the members provide dependent interlocking behavior between the corresponding ratcheting member and the primary ratcheting member whereby the dependent interlocking behavior takes place on the adjoining surfaces orthogonal to the axis in which the ratcheting mechanism is rotatably mounted. Such interlocking behavior is dependent upon the direction of relative torque between the corresponding ratcheting member and the primary ratcheting member thereby allowing relative rotary motion in the first predetermined direction while preventing relative rotary motion in the second predetermined rotary direction. Further, the interlocking behavior between the corresponding ratcheting member and primary ratcheting member can be disabled whereby relative rotary motion between the ratcheting members can be achieved in the second predetermined rotary direction.

20 Claims, 16 Drawing Sheets

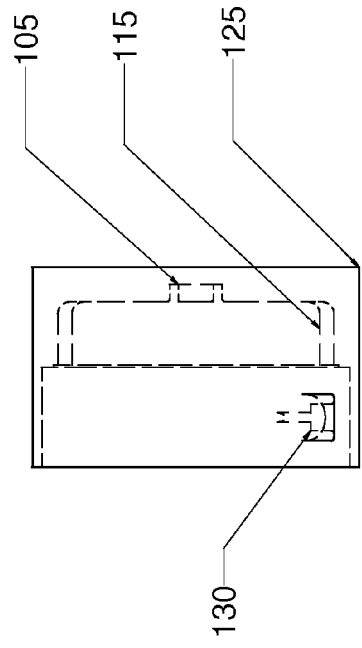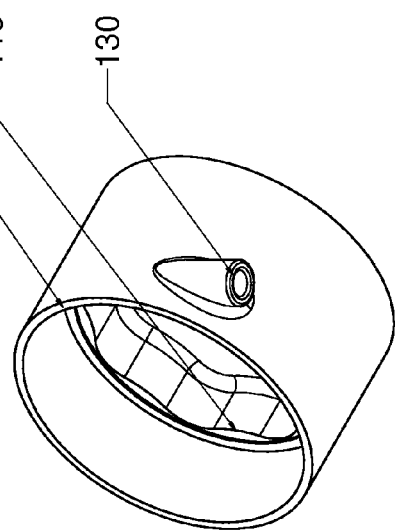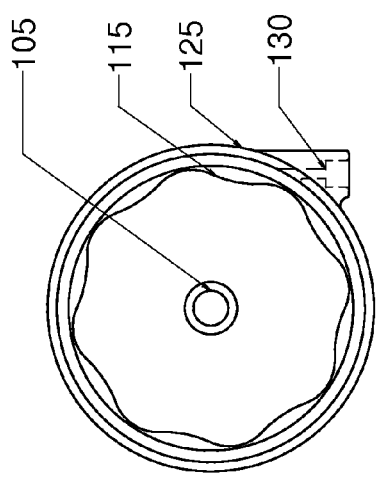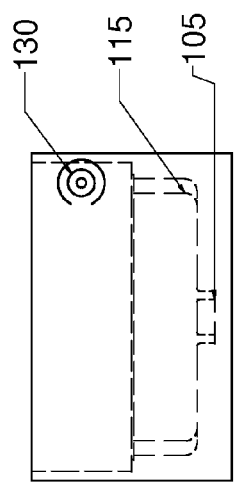
Figure 1C
Figure 1D
Figure 1A
Figure 1B

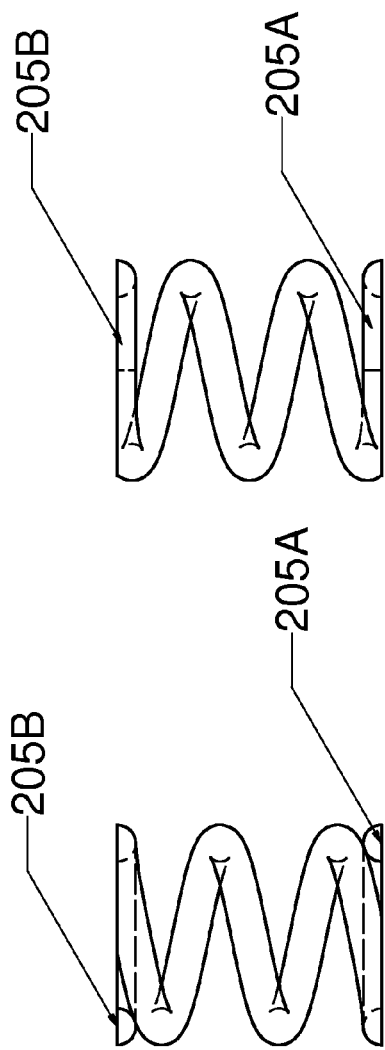
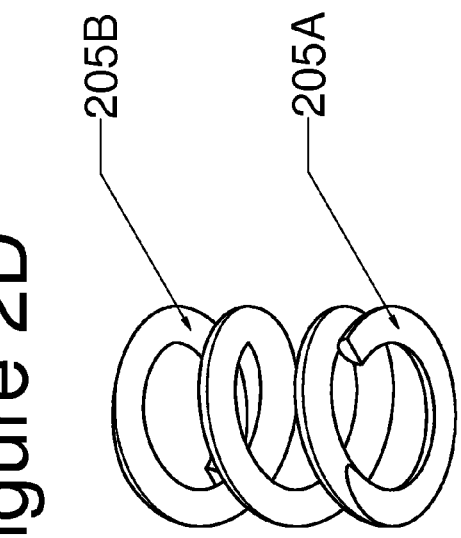
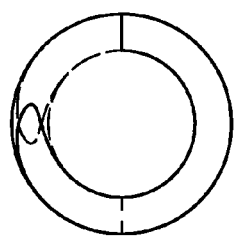
Figure 2A
Figure 2B
Figure 2C
Figure 2D

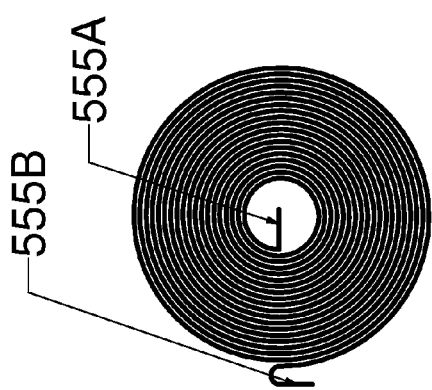
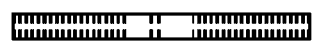
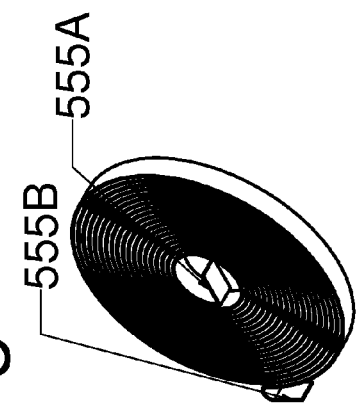
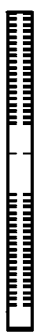
Figure 5A
Figure 5B
Figure 5C
Figure 5D

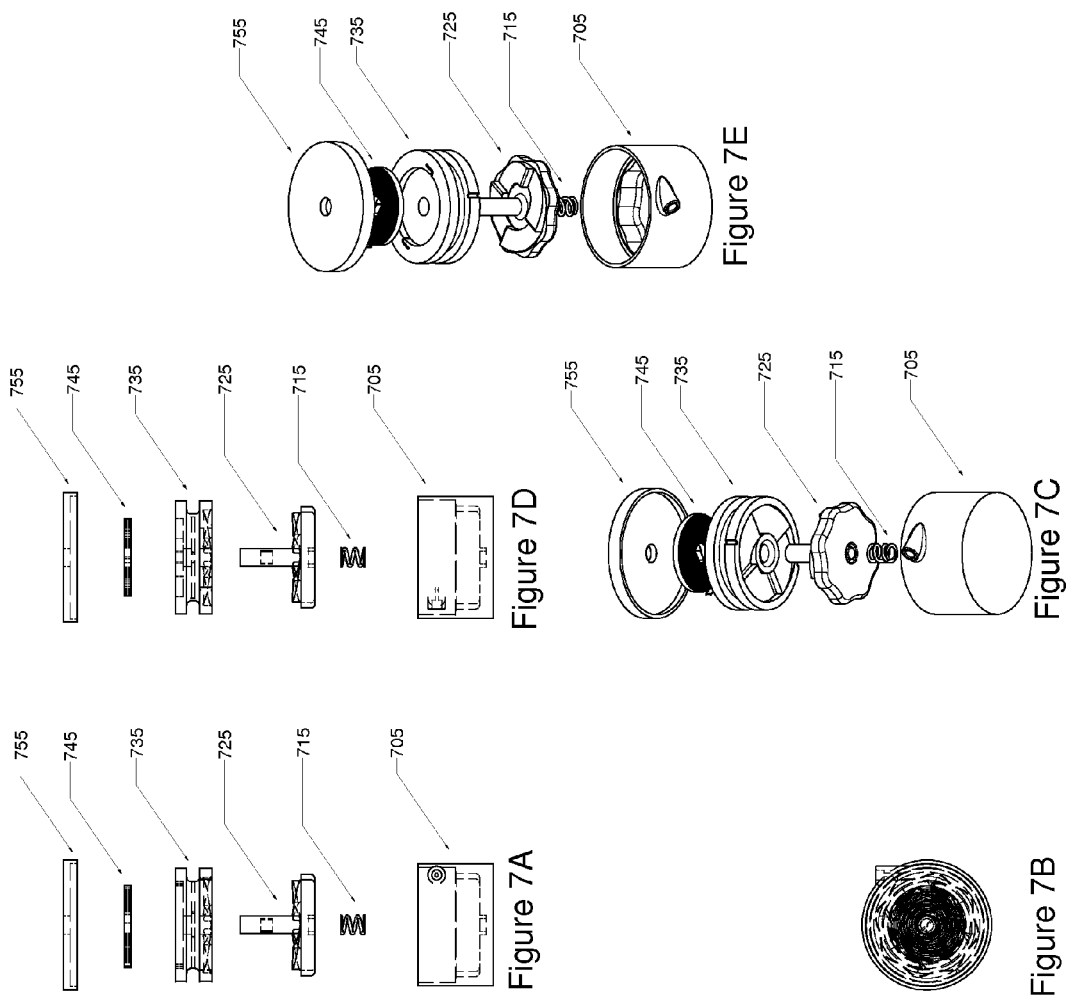

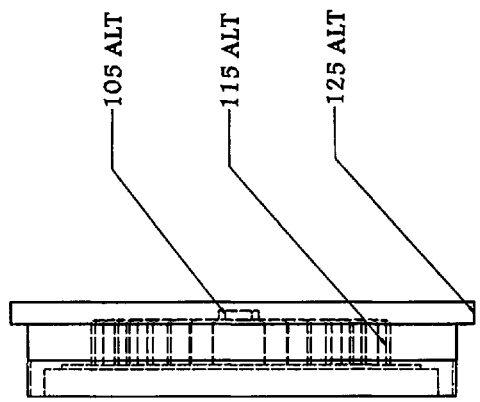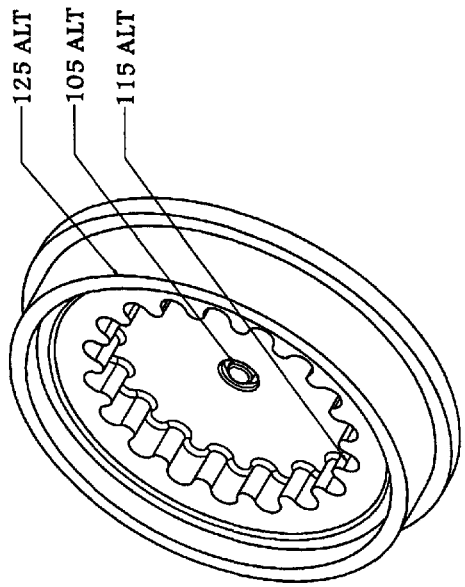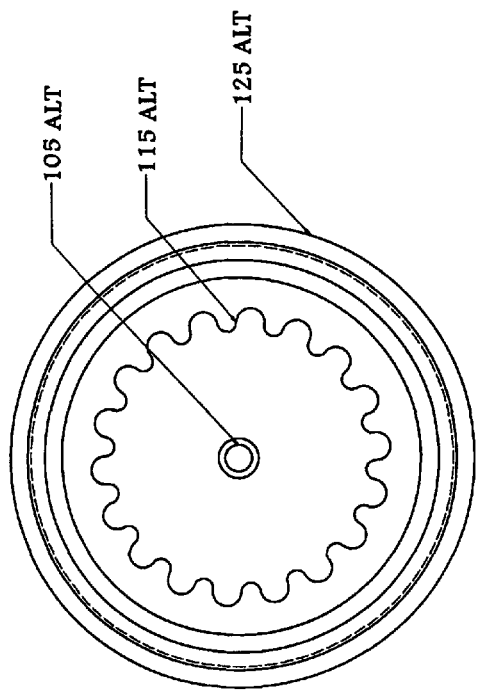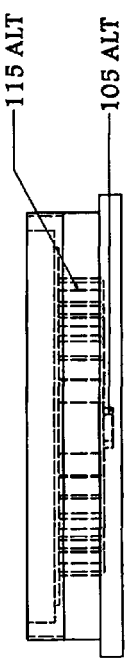
Figure 9A
Figure 9B
Figure 9C
Figure 9D

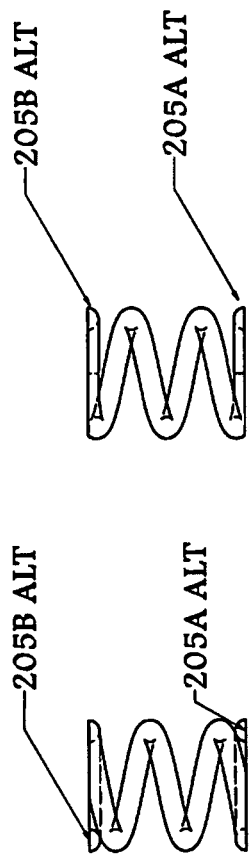
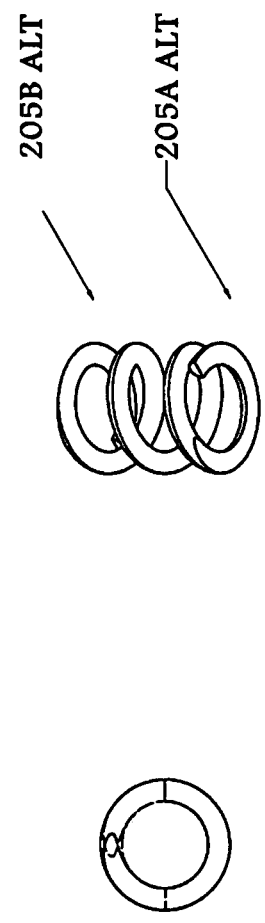
Figure 10A
Figure 10B
Figure 10D
Figure 10C

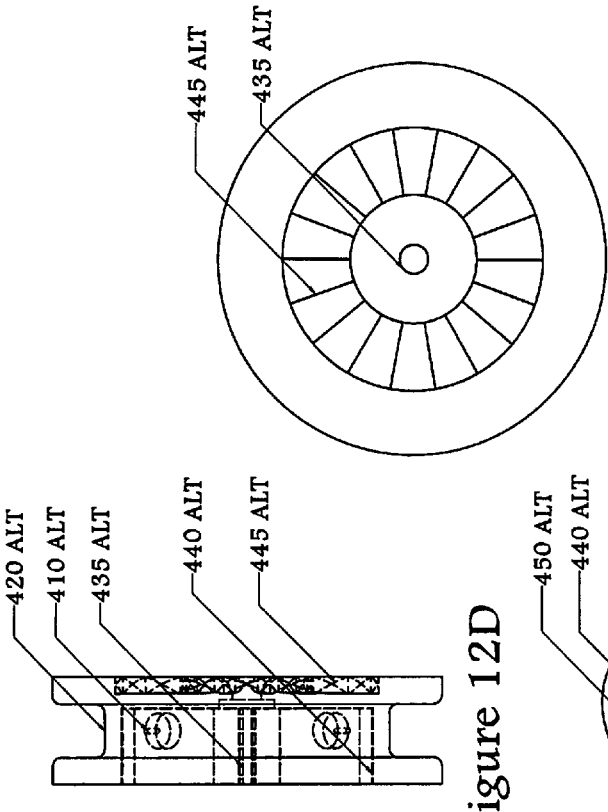
Figure 12A
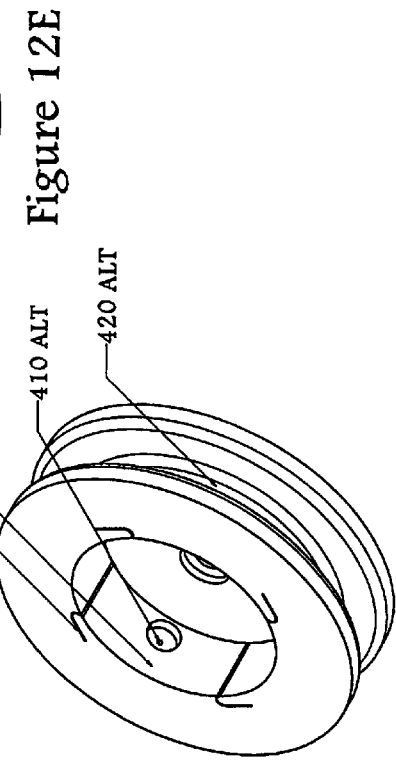
Figure 12C
Figure 12D
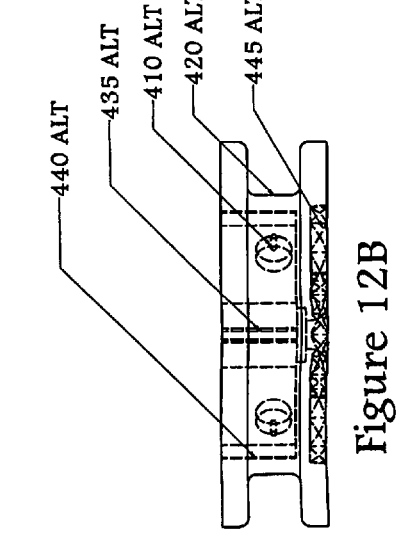
Figure 12E
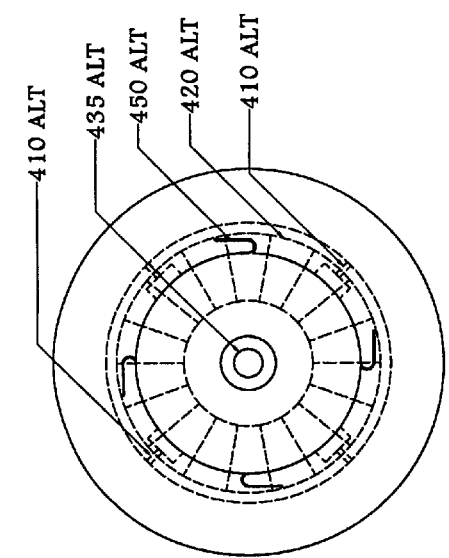
Figure 12B

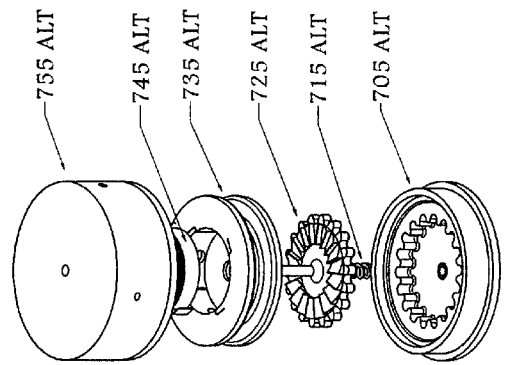
Figure 15A
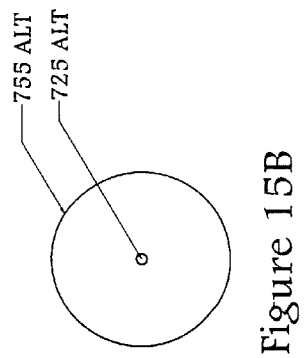
Figure 15B
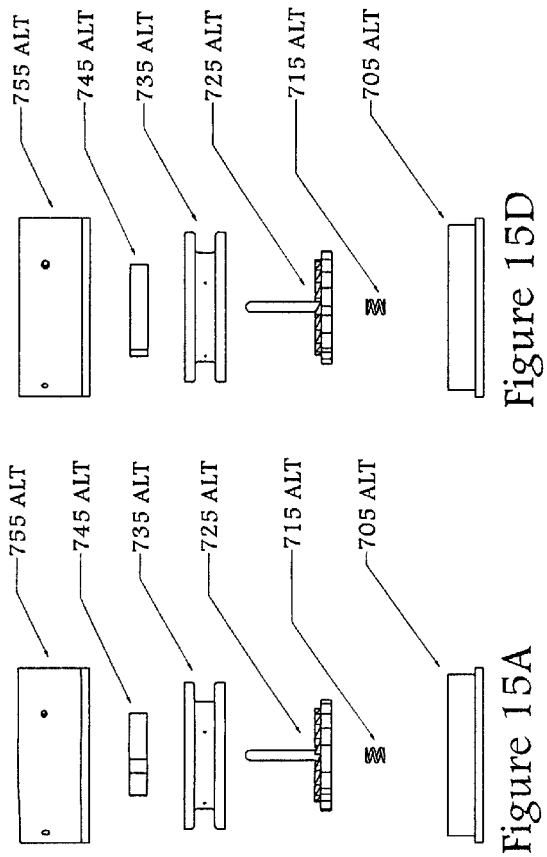
Figure 15D
Figure 15C
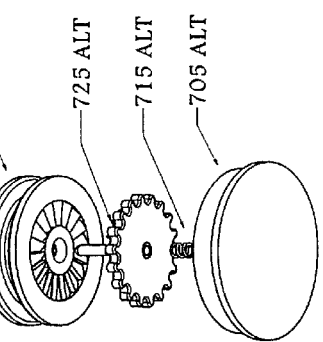
Figure 15E

INNOVATIVE RATCHETING SYSTEM

TECHNICAL FIELD

1. Field of Invention

This invention relates to a device that allows rotation in one direction while preventing rotation in the opposite direction. More specifically, this invention relates to a new and innovative ratcheting system.

2. Background

A ratcheting system being a device that allows unconstrained continual rotational motion in one direction while having the ability to inhibit rotational motion in the opposing direction. Such ratcheting systems have an extensive and broad range of uses spanning multiple industries. Ratcheting systems provide many functional advantages and benefits to users. Uses of ratcheting systems include: a means of applying pressure to a strap in an effort to constrain an object, providing a method to increase tension or reduce slack in cables, providing a convenient means of rapid and organized storage and use of cables and cords, etc. Various examples of such systems include: ratchet lever hoists, ratchet tie-downs, ratchet boat trailer winches, ratchet chain hoists, socket wrenches, clocks, retractable pet leashes, retractable hoses (water, air, oil, electrical, etc), retractable ID lanyards, etc. As it can be seen, the ratcheting system is a remarkable useful device. However the prior art of ratcheting systems results in a number of shortcomings and all operate in a highly similar if not the fundamentally same manner. Specifically, all ratcheting systems to date engage/disengage on the outer circumference of the mechanism. Shortcoming of such systems result from the overextending of this singular ratcheting method to meet all ratcheting design requirements. As a result, designs are often highly complex involving an unnecessary amount of parts which creates additional expense and increases the likelihood of failure. Further such designs often involve complex assembly methods and special machinery. Other ratcheting mechanisms are able to achieve relative simplicity however suffer from troublesome ergonomics and reduced ease of use.

Examples of various ratcheting systems may be found in the following list of U.S. Patent Numbers:

| | |
|---|---|
| 1,276,825 | 4,053,118 |
| 1,446,410 | 4,062,608 |
| 1,737,978 | 4,384,688 |
| 1,865,069 | 4,472,010 |
| 1,958,626 | 4,543,806 |
| 2,206,352 | 4,646,987 |
| 2,211,561 | 5,094,396 |
| 2,262,587 | 6,019,304 |
| 2,678,779 | 6,405,683 |
| 2,979,576 | 6,487,811 |
| 3,061,234 | 6,524,041 |
| 3,578,260 | 6,616,080 |
| 3,584,157 | 7,966,912 B1 |
| 3,657,491 | |

Given the above description of existing ratcheting systems, it will be widely appreciated of a new and novel ratcheting system that offers several important advantages over existing ratcheting mechanisms and methods. In addition, current ratcheting systems are often not efficient in their use of space and provide placement of an unlocking-locking mechanism in which is often not ergonomic or efficient to the end user.

It would therefore be advantageous if there were a ratcheting system that could save space, reduce cost, minimize assembly complexity, require fewer parts, sustain higher torque loads, and provide an ergonomic locking mechanism which meets the desired design requirements.

SUMMARY

This section provides a general summary of the disclosure and is not comprehensive of its full scope or all of its features.

In one representation, the present teachings provide a ratcheting system including a housing, a corresponding ratcheting member, a primary ratcheting member, and a force bearing device. The corresponding ratcheting member is rotatably mounted in the housing and has ridges or reliefs located on the plane perpendicular to the axis which the corresponding ratcheting member rotates. The primary ratcheting member includes interlocking reliefs or ridges that match the corresponding ratcheting member's ridges or reliefs which allow rotation in one direction while preventing rotation in the opposite direction. The force bearing device providing torque between the corresponding ratcheting member and the primary ratcheting member which urges interlock between the two members. The release mechanism thereby separating corresponding ratcheting member's ridges or reliefs from primary ratcheting members reliefs or ridges whereby rotation can be achieved in both rotary directions.

In another representation, the present teachings provide a method for providing continual rotary motion in one rotary direction while retaining the ability to control rotary motion in the opposite direction providing a force causing relative rotary motion in one rotary direction between two rotary member. Further providing, a force bearing device urging rotary ratcheting members to interlock thereby preventing relative rotary motion do to the interlocking behavior taking place on the plane perpendicular to the axis of rotation. Further providing, a release mechanism which separates the rotary ratcheting members resulting in the force bearing device urging the rotary ratcheting members to achieve relative rotary motion in the opposite rotary direction.

In another representation, the present teachings provide a ratcheting system including a housing, a corresponding ratcheting member, and a primary ratcheting member. Further including a means for providing dependent interlocking behavior between the corresponding ratcheting member and the primary ratcheting member whereby the dependent interlocking behavior takes place on the adjoining surfaces orthogonal to the axis of rotation. The interlocking behavior is dependent on the direction of relative torque between the corresponding ratcheting member and the primary ratcheting member thereby allowing relative rotary motion in the first predetermined direction while preventing relative rotary motion in the second predetermined rotary direction. Further including a means for disenabling the interlocking behavior between the corresponding ratcheting member and the primary ratcheting member whereby relative rotary motion can be achieved in the second predetermined rotary direction.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1A is a top orthogonal view of a preferred embodiment of the lower housing member also known as the base.

FIG. 1B is a front orthogonal view of a preferred embodiment of the lower housing member also known as the base.

FIG. 1C is a side orthogonal view of a preferred embodiment of the lower housing member also known as the base.

FIG. 1D is an isometric view of a preferred embodiment of the lower housing member also known as the base.

FIG. 2A is a front orthogonal view of a preferred embodiment of the force bearing device also known as the spring.

FIG. 2B is a top orthogonal view of a preferred embodiment of the force bearing device also known as the spring.

FIG. 2C is a isometric view of a preferred embodiment of the force bearing device also known as the spring.

FIG. 2D is a side orthogonal view of a preferred embodiment of the force bearing device also known as the spring.

FIG. 5A is a top orthogonal view of a preferred embodiment of the rotational force bearing device also known as the spiral spring.

FIG. 5B is a front orthogonal view of a preferred embodiment of the rotational force bearing device also known as the spiral spring.

FIG. 5C is a isometric view of a preferred embodiment of the rotational force bearing device also known as the spiral spring.

FIG. 5D is a side orthogonal view of a preferred embodiment of the rotational force bearing device also known as the spiral spring.

FIG. 7A is a front perspective view of an exploded representation of a preferred embodiment of the ratcheting system in accordance with the invention.

FIG. 7B is a top orthogonal view of a preferred embodiment of the ratcheting system in accordance with the invention.

FIG. 7C is a lower perspective view of an exploded representation of a preferred embodiment of the ratcheting system in accordance with the invention.

FIG. 7D is a side perspective view of an exploded representation of a preferred embodiment of the ratcheting system in accordance with the invention.

FIG. 7E is a above perspective view of an exploded representation of a preferred embodiment of the ratcheting system in accordance with the invention.

FIG. 8D is a side orthogonal hidden line view of an assembled representation of a preferred embodiment of the ratcheting system in accordance with the invention.

FIG. 9A is an alternative design representation to FIG. 1A. The figure is a top orthogonal view of a preferred embodiment of the lower housing member also known as the base.

FIG. 9B is an alternative design representation to FIG. 1B. The figure is a front orthogonal view of a preferred embodiment of the lower housing member also known as the base.

FIG. 9C is an alternative design representation to FIG. 1C. The figure is an isometric view of a preferred embodiment of the lower housing member also known as the base.

FIG. 9D is an alternative design representation to FIG. 1D. The figure is a side orthogonal view of a preferred embodiment of the lower housing member also known as the base.

FIG. 10A is an alternative design representation to FIG. 2A. The figure is a top orthogonal view of a preferred embodiment of the force bearing device also known as the spring.

FIG. 10B is an alternative design representation to FIG. 2B. The figure is a front orthogonal view of a preferred embodiment of the force bearing device also known as the spring.

FIG. 10C is an alternative design representation to FIG. 2C. The figure is a isometric view of a preferred embodiment of the force bearing device also known as the spring.

FIG. 10D is an alternative design representation to FIG. 2D. The figure is a side orthogonal view of a preferred embodiment of the force bearing device also known as the spring.

FIG. 12A is an alternative design representation to FIG. 4A. The figure is a top orthogonal view of a preferred embodiment of the corresponding ratcheting member also known as the rotational interlocking member.

FIG. 12B is an alternative design representation to FIG. 4B. The figure is a front orthogonal view of a preferred embodiment of the corresponding ratcheting member also known as the rotational interlocking member.

FIG. 12C is an alternative design representation to FIG. 4C. The figure is an isometric view of a preferred embodiment of the corresponding ratcheting member also known as the rotational interlocking member.

FIG. 12D is an alternative design representation to FIG. 4D. The figure is a side orthogonal view of a preferred embodiment of the corresponding ratcheting member also known as the rotational interlocking member.

FIG. 12E is an alternative design representation to FIG. 4E. The figure is a bottom orthogonal view of a preferred embodiment of the corresponding ratcheting member also known as the rotational interlocking member.

FIG. 15A is an alternative design representation to FIG. 7A. The figure is a front perspective view of an exploded representation of a preferred embodiment of the ratcheting system in accordance with the invention.

FIG. 15B is an alternative design representation to FIG. 7B. The figure is a top orthogonal view of a preferred embodiment of the ratcheting system in accordance with the invention.

FIG. 15C is an alternative design representation to FIG. 7C. The figure is a lower perspective view of an exploded representation of a preferred embodiment of the ratcheting system in accordance with the invention.

FIG. 15D is an alternative design representation to FIG. 7D. The figure is a side perspective view of an exploded representation of a preferred embodiment of the ratcheting system in accordance with the invention.

FIG. 15E is an alternative design representation to FIG. 7E. The figure is a above perspective view of an exploded representation of a preferred embodiment of the ratcheting system in accordance with the invention.

DETAILED DESCRIPTION OF EXAMPLE EMBODIMENTS

Figure 3E:
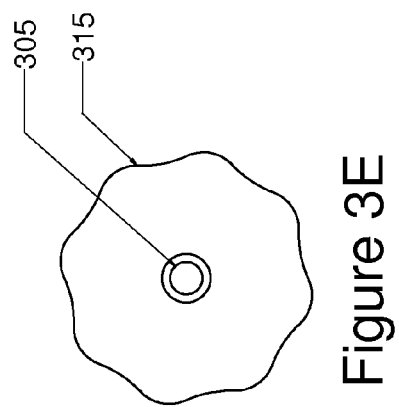
FIG. 3E is a bottom orthogonal view of a preferred embodiment of the primary ratcheting member also known as the interlocker.

Reference will now be made in detail to exemplary embodiments of the invention, which are illustrated in the accompanying drawings. For clear communication a numbering system has been devised such that the first number of a reference number corresponds to the figure thereof. Wherever possible, consistent reference numbers will be used throughout each figure to refer to the same or like parts. Further, wherever possible, care has been given such that second digit of a reference number is the same value as the second digit of an interacting figure's features. For simplicity and illustrative purposes, the principles of the present invention are described by referring mainly to the exemplary embodiments thereof. However, one of ordinary skill in the art would recognize that the same principles are equally applicable to, and can be implemented in, all types of retractable rotational interlocking member systems, and that any variations do not depart from the true spirit and scope of the present invention. Moreover, in the following detailed description, references are made to the accompanying figures, which illustrate specific embodiments. Mechanical, logical, and structural changes may be made to the embodiments without departing from the spirit and scope of the present invention.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and in connection with the recitation of claim elements, or use of a "negative" limitation.

FIG. 1

FIG. 1A is a top orthogonal view of a preferred embodiment of the lower housing member also known as the base. FIG. 1B is a front orthogonal view of a preferred embodiment of the lower housing member also known as the base. FIG. 1C is a side orthogonal view of a preferred embodiment of the lower housing member also known as the base. FIG. 1D is an isometric view of a preferred embodiment of the lower housing member also known as the base. FIG. 1 is a preferred embodiment of a lower housing member also known as the base and is comprised of 105 a circular indentation used to constrain a force bearing device which applies a force on FIG. 3. One method by which this force could be transferred is by use of a spring. The force is directed from 105 to 305 and acts to push FIG. 3 away from FIG. 1. A locking mechanism 115 prevents circular rotation of FIG. 3 as the interlocking shape 115 correlates to the interlocking shape 315. A method to give stability to the system would be to connect the outer structure 125 to FIG. 6, the cap. Methods of connecting the outer structure, 125 of the base to the structure 625 of the cap, may include but is not limited to gluing, taping, screwing, bonding, using any locking mechanism, etc. An opening, 130 can be used as a path for a line, string, cable, cord, rope, etc. that is being retracted in and out of the system. An opening, 130 may also be used as a buffer to prevent debris from entering the system as well as provide a means to prevent the line, string, cable, cord, rope, etc. from being fully retracted into the system.

FIG. 2

FIG. 2A is a front orthogonal view of a preferred embodiment of the force bearing device also known as the spring. FIG. 2B is a top orthogonal view of a preferred embodiment of the force bearing device also known as the spring. FIG. 2C is a isometric view of a preferred embodiment of the force bearing device also known as the spring. FIG. 2D is a side orthogonal view of a preferred embodiment of the force bearing device also known as the spring. FIG. 2 is a preferred embodiment of the force bearing device also known as the spring and is comprised of 205A an attachment point by which 105 constrains the force bearing device to the lower housing member. Further, 205B an attachment point by which 305 constrains the force bearing device to the interlocker. The force bearing device applies a force between points 105 and 305.

FIG. 3

Figure 3D:
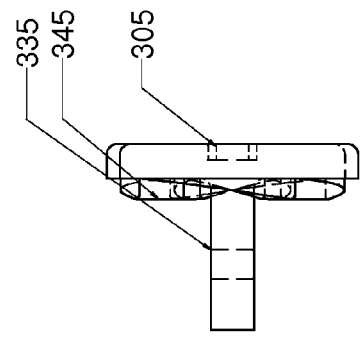
FIG. 3D is a side orthogonal view of a preferred embodiment of the primary ratcheting member also known as the interlocker.
Figure 3C:
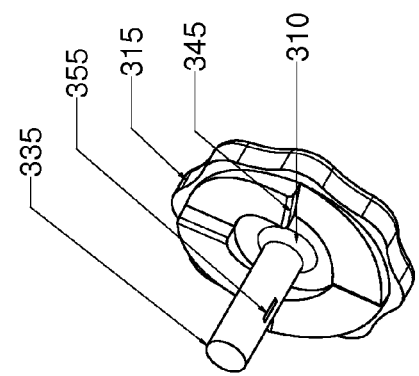
FIG. 3C is a isometric view of a preferred embodiment of the primary ratcheting member also known as the interlocker.
Figure 3A:
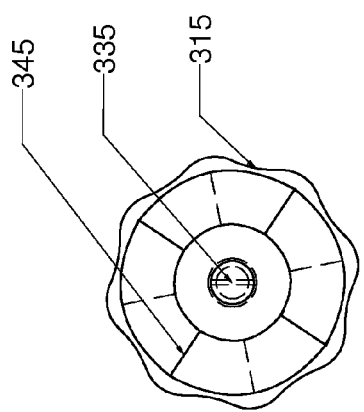
FIG. 3A is a top orthogonal view of a preferred embodiment of the primary ratcheting member also known as the interlocker.
Figure 3B:
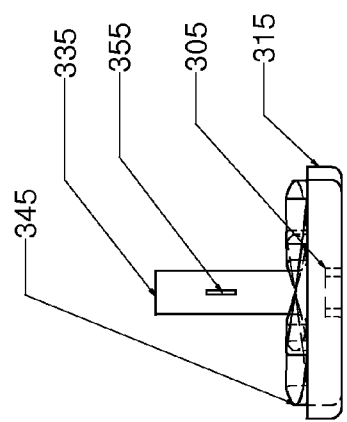
FIG. 3B is a front orthogonal view of a preferred embodiment of the primary ratcheting member also known as the interlocker.

FIG. 3A is a top orthogonal view of a preferred embodiment of the primary ratcheting member also known as the interlocker. FIG. 3B is a front orthogonal view of a preferred embodiment of the primary ratcheting member also known as the interlocker. FIG. 3C is an isometric view of a preferred embodiment of the primary ratcheting member also known as the interlocker. FIG. 3D is a side orthogonal view of a preferred embodiment of the primary ratcheting member also known as the interlocker. FIG. 3E is a bottom orthogonal view of a preferred embodiment of the primary ratcheting member also known as the interlocker. FIG. 3 is a preferred embodiment of a primary ratcheting member also known as the interlocker and is comprised of 305 a circular indentation used to constrain a part which applies a force on FIG. 1. One method by which this force could be transferred is by use of a spring. The force is directed from 305 to 105 and acts to push FIG. 1 away from FIG. 3. A locking mechanism, 315 prevents circular rotation of the interlocker as the interlocking shape, 315 correlates to the interlocking shape 115. The interlocker is however unconstrained to move in a oscillatory motion, into and out of the interlocking shape 115. 310 acts to guide and assist in properly aligning the interlocker with FIG. 4. Graduated ridges, 345 while in contact with graduated reliefs, 445 act as the locking mechanism thereby limiting rotational motion of FIG. 4 to only one direction. However, there are many alternative methods by which rotational motion could be limited including use of a simple pivoting member arm which is positioned such that rotational behavior is allowed in one predetermined rotary direction while prevented in the opposite predetermined rotary direction. Further, such behavior could be achieved by a member moving in a linear motion into and out of graduated reliefs or ridges 445. Graduated ridges, 345 while disengaged from the graduated reliefs, 445 allow multi-directional rotational motion of FIG. 4 to freely rotate. One method for generating the rotational force could be by use of a spring which could be attached to an arbor cutout, 355 and to a rotational cutout, 455 as shown in FIG. 4. One method for disengaging the locking mechanism is by applying force to an arbor, 335 thereby separating the ridges, 345 from the reliefs, 445.

FIG. 4

Figure 4E:
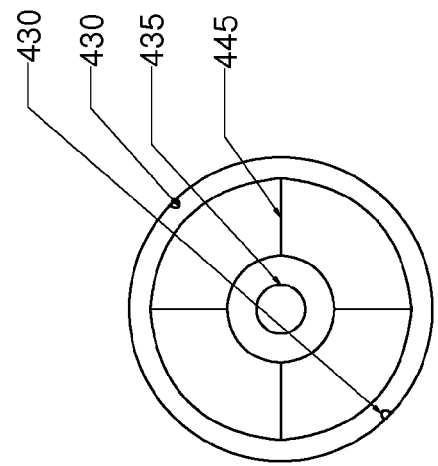
FIG. 4E is a bottom orthogonal view of a preferred embodiment of the corresponding ratcheting member also known as the rotational interlocking member.
Figure 4D:
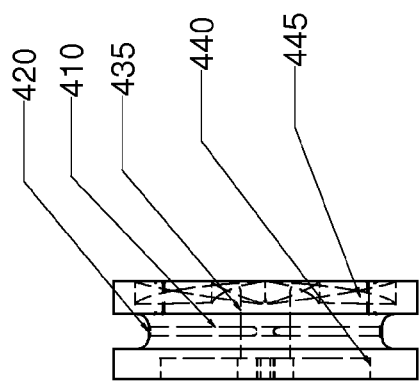
FIG. 4D is a side orthogonal view of a preferred embodiment of the corresponding ratcheting member also known as the rotational interlocking member.
Figure 4C:
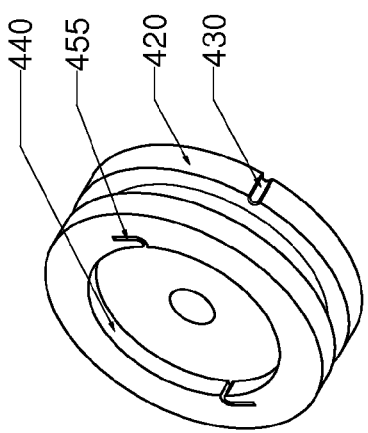
FIG. 4C is a isometric view of a preferred embodiment of the corresponding ratcheting member also known as the rotational interlocking member.
Figure 4A:
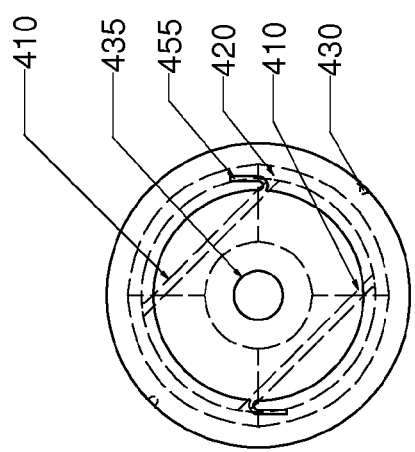
FIG. 4A is a top orthogonal view of a preferred embodiment of the corresponding ratcheting member also known as the rotational interlocking member.
Figure 4B:
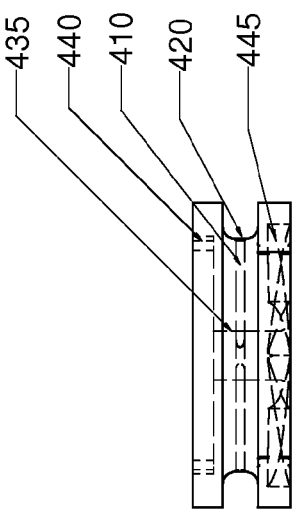
FIG. 4B is a front orthogonal view of a preferred embodiment of the corresponding ratcheting member also known as the rotational interlocking member.

FIG. 4A is a top orthogonal view of a preferred embodiment of the corresponding ratcheting member also known as the rotational interlocking member. FIG. 4B is a front orthogonal view of a preferred embodiment of the corresponding ratcheting member also known as the rotational interlocking member. FIG. 4C is an isometric view of a preferred embodiment of the corresponding ratcheting member also known as the rotational interlocking member. FIG. 4D is a side orthogonal view of a preferred embodiment of the corresponding ratcheting member also known as the rotational interlocking member. FIG. 4E is a bottom orthogonal view of a preferred embodiment of the corresponding ratcheting member also known as the rotational interlocking member. FIG. 4 is a preferred embodiment of a corresponding ratcheting member also known as the rotational interlocking member and is comprised of 420, a reel used to house the cord that is being retracted. Some examples of what the cord could be comprised of may include: rope, metal, plastic, rubber, etc. The cord may be secured to the system. One method by which the cord may be attached to the system is by use of the cable tunnel, 410. Methods of connecting the cord to the cord tunnel, 410 may include but is not limited to taping, screwing, bonding, using adhesives, using any locking mechanism, etc. A notch, 430 aid in the assembly process of the system. The notch, 430 may be used to install the cord and corresponding ratcheting member into the lower housing member with obstructions. Graduated reliefs, 445 while in contact with graduated ridges, 345 act as the locking mechanism thereby limiting rotational motion of the rotational interlocking member to only one direction. However, there are many alternative methods by which rotational motion could be limited including use of a simple pivoting member arm which is positioned such that rotational behavior is allowed in one predetermined rotary direction while prevented in the opposite predetermined rotary direction. Further, such behavior could be achieved by a member moving in a linear motion into and out of graduated reliefs or ridges 445. Graduated reliefs, 445 while disengaged from the graduated ridges, 345 allow multi-directional rotational motion of the rotational interlocking member to freely rotate. An arbor housing, 435 is one possible method for guiding the arbor, 335 onto and off of the interlocker. The cavity, 440 may be used to house a spring or any other rotational force producing device. One method for generating a rotational force could be by use of a spiral spring which could be attached to the rotational cutout, 455 and to the arbor cutout, 355. Other methods of attaching the may include but is not limited to taping, screwing, bonding, using adhesives, using any locking reliefs, etc.

FIG. 5

FIG. 5A is a top orthogonal view of a preferred embodiment of the rotational force bearing device also known as the spiral spring. FIG. 5B is a front orthogonal view of a preferred embodiment of the rotational force bearing device also known as the spiral spring. FIG. 5C is a isometric view of a preferred embodiment of the rotational force bearing device also known as the spiral spring. FIG. 5D is a side orthogonal view of a preferred embodiment of the rotational force bearing device also known as the spiral spring. FIG. 5 is a preferred embodiment of the rotational force bearing device also known as the spiral spring and is comprised of 555A an attachment point by which 455 constrains the rotational force bearing device to the rotational interlocking member. Further, 555B an attachment point by which 355 constrains the rotational force bearing device to the interlocker. The force bearing device applies a force urging rotation between points 455 and 355.

FIG. 6

Figure 6A:
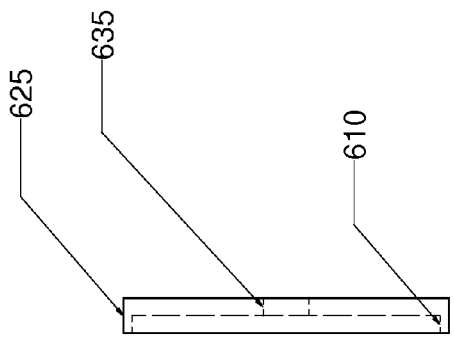
FIG. 6A is a top orthogonal view of a preferred embodiment of the upper housing member also known as the cap.
Figure 6C:
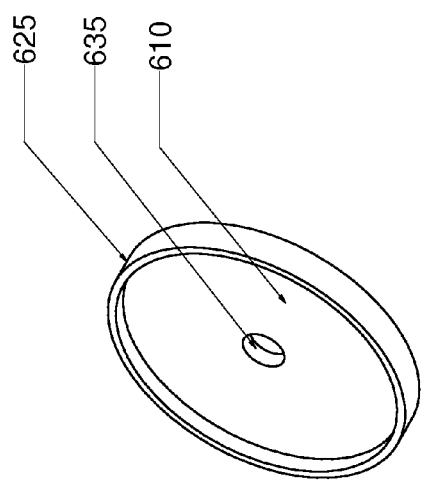
FIG. 6C is a isometric view of a preferred embodiment of the upper housing member also known as the cap.
Figure 6B:
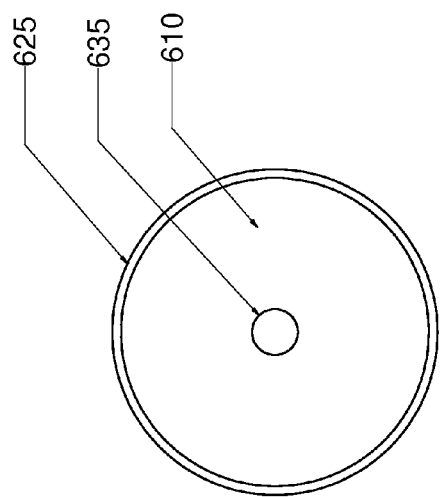
FIG. 6B is a front orthogonal view of a preferred embodiment of the upper housing member also known as the cap.
Figure 6D:
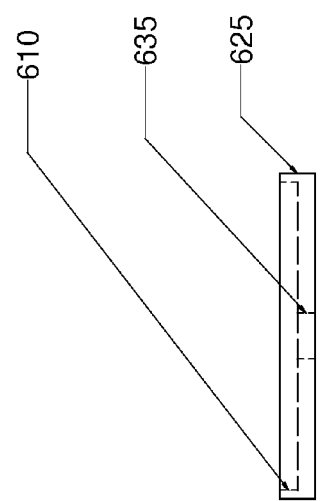
FIG. 6D is a side orthogonal view of a preferred embodiment of the upper housing member also known as the cap.

FIG. 6A is a top orthogonal view of a preferred embodiment of the upper housing member also known as the cap. FIG. 6B is a front orthogonal view of a preferred embodiment of the upper housing member also known as the cap. FIG. 6C is an isometric view of a preferred embodiment of the upper housing member also known as the cap. FIG. 6D is a side orthogonal view of a preferred embodiment of the upper housing member also known as the cap. FIG. 6 is a preferred embodiment of an upper housing member also known as the cap and is comprised of an inner cap wall, 610 used to encapsulate the spiral spring FIG. 5 or any other rotational force producing device. The inner cap wall, 610 may also be used to create a barrier preventing debris from entering the system. An arbor guide hole, 635 is one possible method for aligning the interlocker in the correct orientation. A method to give stability to the system would be to connect an outer cap wall, 625 to the outer structure, 125 of the base. Methods of connecting the cap to the lower housing member may include but is not limited to gluing, taping, screwing, bonding, or using any locking mechanism, etc.

FIG. 7

FIG. 7A is a front perspective view of an exploded representation of a preferred embodiment of the ratcheting system in accordance with the invention. FIG. 7B is a top orthogonal view of a preferred embodiment of the ratcheting system in accordance with the invention. FIG. 7C is a lower perspective view of an exploded representation of a preferred embodiment of the ratcheting system in accordance with the invention. FIG. 7D is a side perspective view of an exploded representation of a preferred embodiment of the ratcheting system in accordance with the invention. FIG. 7E is an above perspective view of an exploded representation of a preferred embodiment of the ratcheting system in accordance with the invention. FIG. 7 is a preferred embodiment of a ratcheting system and is comprised of the following connected in a series arrangement: a lower housing member 705, a force bearing device 715, a primary ratcheting member 725, a corresponding ratcheting member 735, a rotational force bearing device 745, and an upper housing member 755.

FIG. 8

Figure 8A:
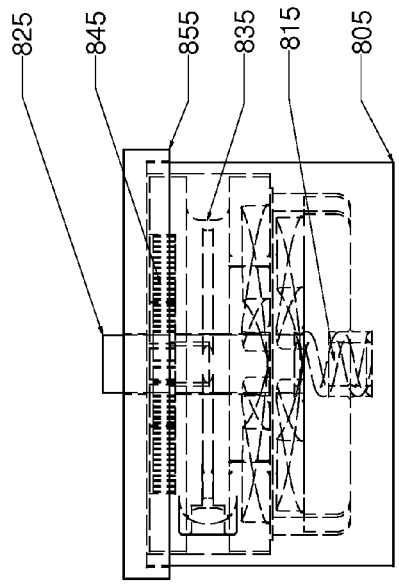
FIG. 8A is a front orthogonal hidden line view of an assembled representation of a preferred embodiment of the ratcheting system in accordance with the invention.
Figure 8C:
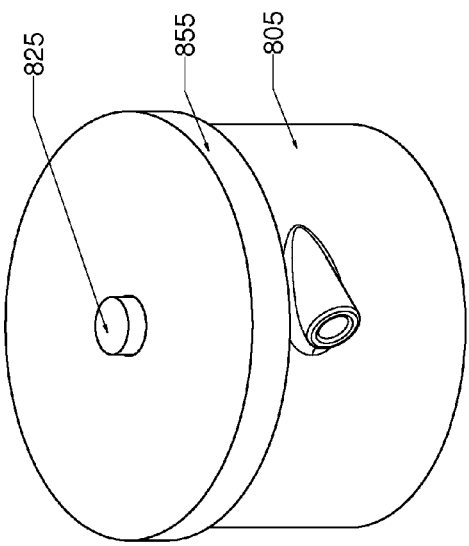
FIG. 8C is a upper isometric view of an assembled representation of a preferred embodiment of the ratcheting system in accordance with the invention.
Figure 8A:
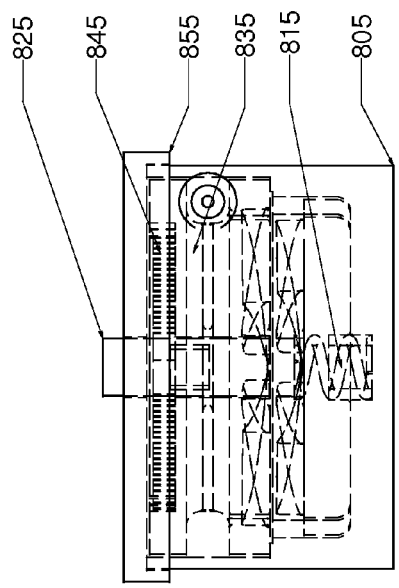
Figure 8B:
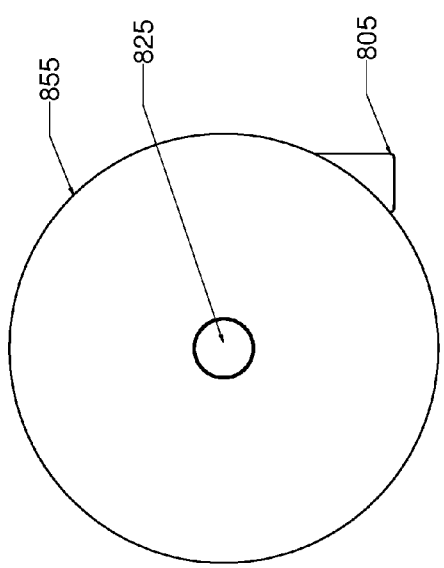
FIG. 8B is a top orthogonal view of an assembled representation of a preferred embodiment of the ratcheting system in accordance with the invention.

FIG. 8A is a front orthogonal hidden line view of an assembled representation of a preferred embodiment of the ratcheting system in accordance with the invention. FIG. 8B is a top orthogonal view of an assembled representation of a preferred embodiment of the ratcheting system in accordance with the invention. FIG. 8C is a upper isometric view of an assembled representation of a preferred embodiment of the ratcheting system in accordance with the invention. FIG. 8D is a side orthogonal hidden line view of an assembled representation of a preferred embodiment of the ratcheting system in accordance with the invention. FIG. 8 is a preferred embodiment of a ratcheting system and is comprised of a lower housing member 805, a force bearing device 815, a primary ratcheting member 825, a corresponding ratcheting member 835, a rotational force bearing device 845, and an upper housing member 855.

FIGS. 9A-C

FIG. 9A is a top orthogonal view of a preferred embodiment of the lower housing member also known as the base. FIG. 9B is a front orthogonal view of a preferred embodiment of the lower housing member also known as the base. FIG. 9C is an isometric view of a preferred embodiment of the lower housing member also known as the base. FIG. 9D is a side orthogonal view of a preferred embodiment of the lower housing member also known as the base. FIGS. 9A-C is a preferred embodiment of a lower housing member also known as the base and is comprised of 105 ALT a circular indentation used to constrain a part which applies a force on FIGS. 11A-E. One method by which this force could be transferred is by use of a spring. The force is directed from 105 ALT to 305 ALT and acts to push FIGS. 11A-E away from FIGS. 9A-C. A locking mechanism 115 ALT prevents circular rotation of FIGS. 11A-E as the interlocking shape 115 ALT correlates to the interlocking shape 315 ALT. A method to give stability to the system would be to connect the outer structure 125 ALT to FIGS. 14A-D, the cap. Methods of connecting the outer structure, 125 ALT of the base to the structure 625 ALT of the cap, may include but is not limited to gluing, taping, screwing, bonding, using any locking mechanism, etc. An opening, 620 ALT can be used as a path for a line, string, cable, cord, rope, etc. that is being retracted in and out of the system. An opening, 620 ALT may also be used as a buffer to prevent debris from entering the system as well as provide a means to prevent the line, string, cable, cord, rope, etc. from being fully retracted into the system.

FIGS. 10A-D

FIG. 10A is a front orthogonal view of a preferred embodiment of the force bearing device also known as the spring. FIG. 10B is a top orthogonal view of a preferred embodiment of the force bearing device also known as the spring. FIG. 10C is a isometric view of a preferred embodiment of the force bearing device also known as the spring. FIG. 10D is a side orthogonal view of a preferred embodiment of the force bearing device also known as the spring. FIG. 10A is a preferred embodiment of the force bearing device also known as the spring and is comprised of 205A ALT an attachment point by which 105 ALT constrains the force bearing device to the lower housing member. Further, 205B ALT an attachment point by which 305 ALT constrains the force bearing device to the interlocker. The force bearing device applies a force between points 105 ALT and 305 ALT.

FIGS. 11A-E

Figure 11D:
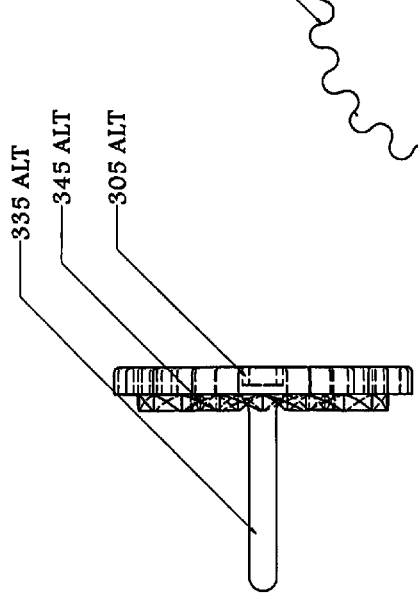
FIG. 11D is an alternative design representation to FIG. 3D. The figure is a side orthogonal view of a preferred embodiment of the primary ratcheting member also known as the interlocker.
Figure 11E:
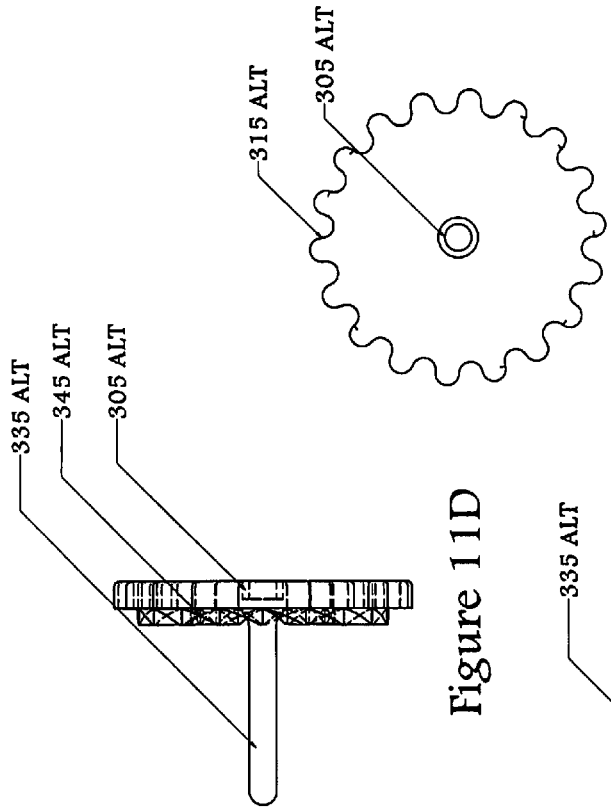
FIG. 11E is an alternative design representation to FIG. 3E. The figure is a bottom orthogonal view of a preferred embodiment of the primary ratcheting member also known as the interlocker.
Figure 11C:
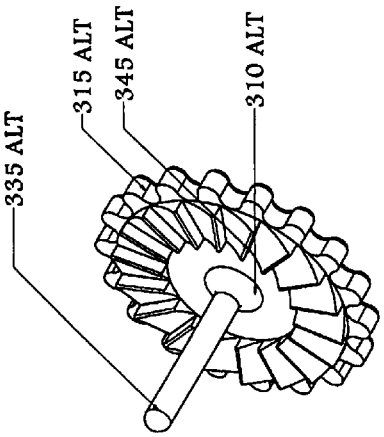
FIG. 11C is an alternative design representation to FIG. 3C. The figure is an isometric view of a preferred embodiment of the primary ratcheting member also known as the interlocker.
Figure 11A:
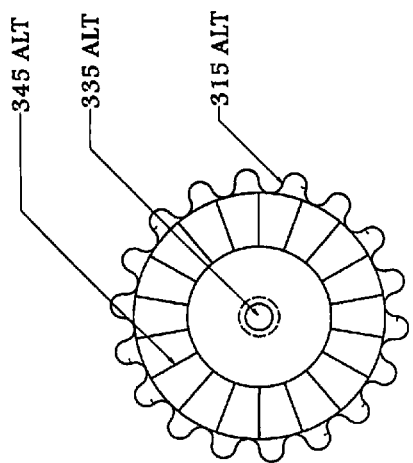
FIG. 11A is an alternative design representation to FIG. 3A. The figure is a top orthogonal view of a preferred embodiment of the primary ratcheting member also known as the interlocker.
Figure 11B:
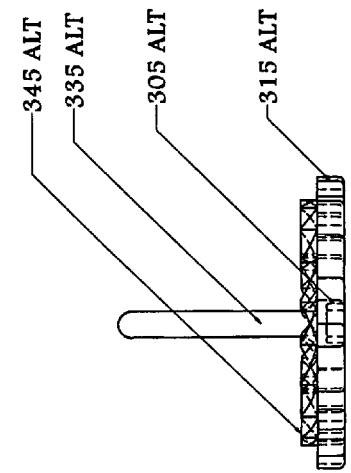
FIG. 11B is an alternative design representation to FIG. 3B. The figure is a front orthogonal view of a preferred embodiment of the primary ratcheting member also known as the interlocker.

FIG. 11A is a top orthogonal view of a preferred embodiment of the primary ratcheting member also known as the interlocker. FIG. 11B is a front orthogonal view of a preferred embodiment of the primary ratcheting member also known as the interlocker. FIG. 11C is an isometric view of a preferred embodiment of the primary ratcheting member also known as the interlocker. FIG. 11D is a side orthogonal view of a preferred embodiment of the primary ratcheting member also known as the interlocker. FIG. 11E is a bottom orthogonal view of a preferred embodiment of the primary ratcheting member also known as the interlocker. FIG. 11A is a preferred embodiment of a primary ratcheting member also known as the interlocker and is comprised of 305 Alternative, a circular indentation used to constrain a part which applies a force on FIG. 9A. One method by which this force could be transferred is by use of a spring. The force is directed from 305 ALT to 105 ALT and acts to push FIG. 9A away from FIG. 11A. A locking mechanism, 315 ALT prevents circular rotation of the interlocker as the interlocking shape, 315 ALT correlates to the interlocking shape 115 ALT. The interlocker is however unconstrained to move in a oscillatory motion, into and out of the interlocking shape 115 ALT. 310 ALT acts to guide and assist in properly aligning the interlocker with FIG. 12A. Graduated ridges, 345 ALT while in contact with graduated reliefs, 445 ALT act as the locking mechanism thereby limiting rotational motion of FIG. 12A to only one direction. However, there are many alternative methods by which rotational motion could be limited including use of a simple pivoting member arm which is positioned such that rotational behavior is allowed in one predetermined rotary direction while prevented in the opposite predetermined rotary direction. Further, such behavior could be achieved by a member moving in a linear motion into and out of graduated reliefs or ridges 445 ALT. Graduated ridges, 345 ALT while disengaged from the graduated reliefs, 445 ALT allow multi-directional rotational motion of FIG. 12A to freely rotate. One method for generating the rotational force could be by use of a spiral spring which could be attached to cutout, 640 ALT and to a rotational cutout, 450 ALT as shown in FIG. 12A. One method for disengaging the locking mechanism is by applying force to an arbor, 335 ALT thereby separating the ridges, 345 ALT from the reliefs, 445 ALT.

FIG. 12A

FIG. 12A is a top orthogonal view of a preferred embodiment of the corresponding ratcheting member also known as the rotational interlocking member. FIG. 12B is a front orthogonal view of a preferred embodiment of the corresponding ratcheting member also known as the rotational interlocking member. FIG. 12C is an isometric view of a preferred embodiment of the corresponding ratcheting member also known as the rotational interlocking member. FIG. 12D is a side orthogonal view of a preferred embodiment of the corresponding ratcheting member also known as the rotational interlocking member. FIG. 12E is a bottom orthogonal view of a preferred embodiment of the corresponding ratcheting member also known as the rotational interlocking member. FIG. 12A is a preferred embodiment of a corresponding ratcheting member also known as the rotational interlocking member and is comprised of 420 ALT, a reel used to house the retractable cord. Some examples of what the cord could be comprised of may include: rope, metal, plastic, rubber, etc. The cord may be secured to the system. One method by which the cord may be attached to the system is by use of the cable tunnel, 410 ALT. Methods of connecting the cord to the cord tunnel, 410 ALT may include but is not limited to taping, screwing, using adhesives, bonding, using any locking mechanism, etc. Graduated reliefs, 445 ALT while in contact with graduated ridges, 345 ALT act as the locking mechanism thereby limiting rotational motion of the rotational interlocking member to only one direction. However, there are many alternative methods by which rotational motion could be limited including use of a simple pivoting member arm which is positioned such that rotational behavior is allowed in one predetermined rotary direction while prevented in the opposite predetermined rotary direction. Further, such behavior could be achieved by a member moving in a linear motion into and out of graduated reliefs or ridges 445. Graduated reliefs, 445 ALT while disengaged from the graduated ridges, 345 ALT allow multi-directional rotational motion of the rotational interlocking member to freely rotate. An arbor housing, 435 ALT is one possible method for guiding the arbor, 335 ALT on and off the interlocker. The cavity, 440 ALT may be used to house a spring or any other rotational force producing device. One method for generating a rotational force could be by use of a spiral spring which could be attached to the rotational cutout, 450 ALT and to the cutout, 640 ALT. Other methods of attaching the may include but is not limited to taping, screwing, using adhesives, bonding, using any locking reliefs, etc.

FIG. 13A

Figure 13A:
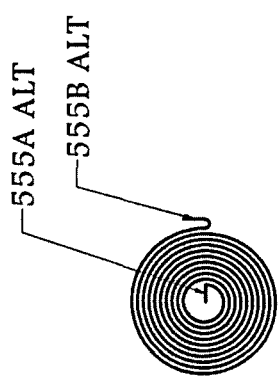
FIG. 13A is an alternative design representation to FIG. 5A. The figure is a top orthogonal view of a preferred embodiment of the rotational force bearing device also known as the spiral spring.
Figure 13D:
FIG. 13D is an alternative design representation to FIG. 5D. The figure is a side orthogonal view of a preferred embodiment of the rotational force bearing device also known as the spiral spring.
Figure 13C:
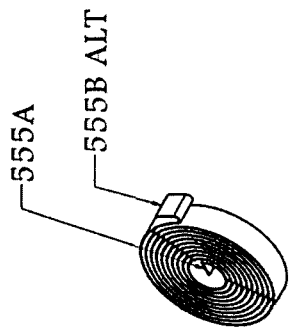
FIG. 13C is an alternative design representation to FIG. 5C. The figure is a isometric view of a preferred embodiment of the rotational force bearing device also known as the spiral spring.
Figure 13B:
FIG. 13B is an alternative design representation to FIG. 5B. The figure is a front orthogonal view of a preferred embodiment of the rotational force bearing device also known as the spiral spring.

FIG. 13A is a top orthogonal view of a preferred embodiment of the rotational force bearing device also known as the spiral spring. FIG. 13B is a front orthogonal view of a preferred embodiment of the rotational force bearing device also known as the spiral spring. FIG. 13C is a isometric view of a preferred embodiment of the rotational force bearing device also known as the spiral spring. FIG. 13D is a side orthogonal view of a preferred embodiment of the rotational force bearing device also known as the spiral spring. FIG. 13A is a preferred embodiment of the rotational force bearing device also known as the spiral spring and is comprised of 555A ALT an attachment point by which 655 ALT constrains the rotational force bearing device to the upper housing member. Further, 555B ALT an attachment point by which 455 ALT constrains the rotational force bearing device to the rotational interlocking member. The force bearing device applies a force urging rotation between points 455 ALT and 655 ALT.

FIGS. 14A-D

Figure 14A:
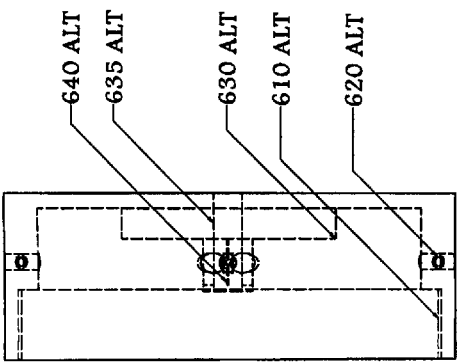
FIG. 14A is an alternative design representation to FIG. 6A. The figure is a top orthogonal view of a preferred embodiment of the upper housing member also known as the cap.
Figure 14B:
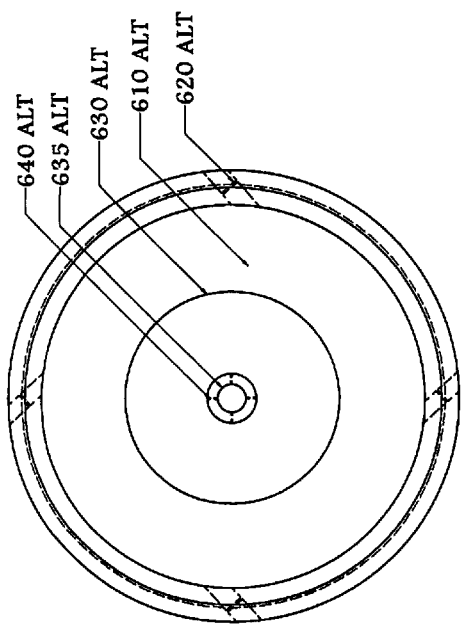
FIG. 14B is an alternative design representation to FIG. 6B. The figure is a front orthogonal view of a preferred embodiment of the upper housing member also known as the cap.
Figure 14C:
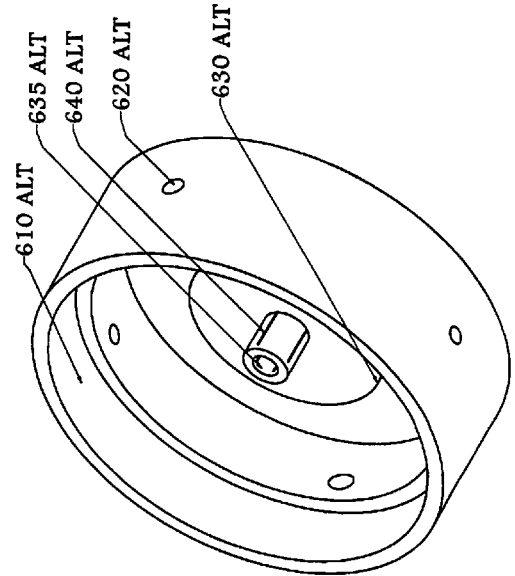
FIG. 14C is an alternative design representation to FIG. 6C. The figure is an isometric view of a preferred embodiment of the upper housing member also known as the cap.
Figure 14D:
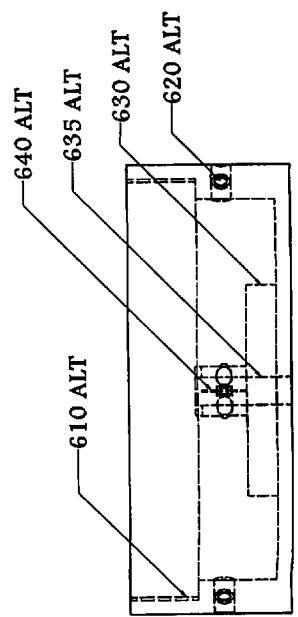
FIG. 14D is an alternative design representation to FIG. 6D. The figure is a side orthogonal view of a preferred embodiment of the upper housing member also known as the cap.

FIG. 14A is a top orthogonal view of a preferred embodiment of the upper housing member also known as the cap. FIG. 14B is a front orthogonal view of a preferred embodiment of the upper housing member also known as the cap. FIG. 14C is an isometric view of a preferred embodiment of the upper housing member also known as the cap. FIG. 14D is a side orthogonal view of a preferred embodiment of the upper housing member also known as the cap. FIG. 14A is a preferred embodiment of an upper housing member also known as the cap and is comprised of an inner cap extrusion, 630 ALT used to encapsulate the spring or any other force producing device. The inner cap wall, 610 ALT may be used to create a barrier preventing debris from entering the system. An arbor guide hole, 635 ALT is one possible method for aligning the interlocker in the correct orientation. A method to give stability to the system would be to connect an outer cap wall, 625 ALT to the outer structure, 125 ALT, of the base. Methods of connecting the cap to the lower housing member may include but is not limited to gluing, taping, screwing, bonding, or using any locking mechanism, etc. One method for generating the rotational force could be by use of a spiral spring which could be attached to an cutout, 655 ALT and to a rotational cutout, 455 ALT as shown in FIG. 12A. An opening, 620 ALT can be used as a path for a line, string, cable, cord, rope, etc. that is being retracted in and out of the system. An opening, 620 ALT may also be used as a buffer to prevent debris from entering the system as well as provide a means to prevent the line, string, cable, cord, rope, etc. from being fully retracted into the system.

FIGS. 15A-E

FIG. 15A is a front perspective view of an exploded representation of a preferred embodiment of the ratcheting system in accordance with the invention. FIG. 15B is a top orthogonal view of a preferred embodiment of the ratcheting system in accordance with the invention. FIG. 15C is a lower perspective view of an exploded representation of a preferred embodiment of the ratcheting system in accordance with the invention. FIG. 15D is a side perspective view of an exploded representation of a preferred embodiment of the ratcheting system in accordance with the invention. FIG. 15E is an above perspective view of an exploded representation of a preferred embodiment of the ratcheting system in accordance with the invention. FIG. 15A is a preferred embodiment of a ratcheting system and is comprised of the following connected in a series arrangement: a lower housing member 705 ALT, a force bearing device 715 ALT, a primary ratcheting member 725 ALT, a corresponding ratcheting member 735 ALT, a rotational force bearing device 745 ALT, and an upper housing member 755 ALT.

FIGS. 16A-C

Figure 16A:
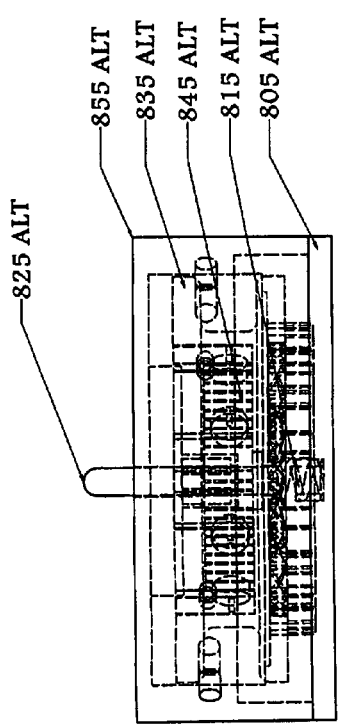
FIG. 16A is an alternative design representation. The figure is a front orthogonal hidden line view of an assembled representation of a preferred embodiment of the ratcheting system in accordance with the invention.
Figure 16C:
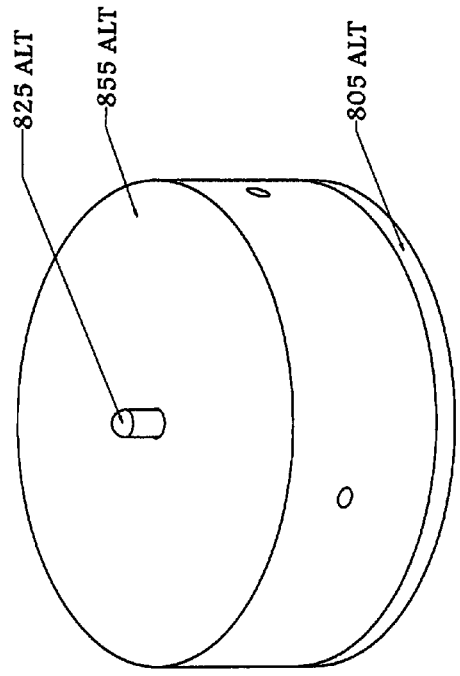
FIG. 16C is an alternative design representation. The figure is an upper isometric view of an assembled representation of a preferred embodiment of the ratcheting system in accordance with the invention.
Figure 16B:
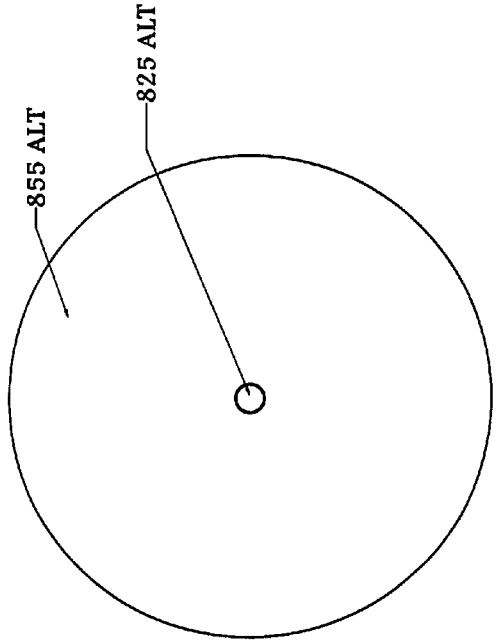
FIG. 16B is an alternative design representation. The figure is a top orthogonal view of an assembled representation of a preferred embodiment of the ratcheting system in accordance with the invention.

FIG. 16A is a front orthogonal hidden line view of an assembled representation of a preferred embodiment of the ratcheting system in accordance with the invention. FIG. 16B is a top orthogonal view of an assembled representation of a preferred embodiment of the ratcheting system in accordance with the invention. FIG. 16C is an upper isometric view of an assembled representation of a preferred embodiment of the ratcheting system in accordance with the invention. FIG. 16A is a preferred embodiment of a ratcheting system and is comprised of a lower housing member 805 ALT, a force bearing device 815 ALT, a primary ratcheting member 825 ALT, a corresponding ratcheting member 835 ALT, a rotational force bearing device 845 ALT, and an upper housing member 855 ALT.

What is claimed is:

1. A ratcheting system, comprising:
   a housing comprising a cavity having a first interlocking shape defined therein, the first interlocking shape formed along an interior periphery portion of the cavity;
   a primary ratcheting member comprising a base portion and a shaft generally extending transversely from the base portion, the base portion comprising a plurality of reliefs generally extending transversely from the base portion, wherein an outer periphery of the base portion comprises a second interlocking shape for interlocking with the first interlocking shape of the housing, wherein the base portion is adapted and configured for fitting within the cavity of the housing such that the first and second interlocking shapes interengage therewith to prevent rotation therebetween;
   a corresponding ratcheting member rotatably mounted to the shaft of the primary ratcheting member, the corresponding ratcheting member comprising a first side and a second side, the first side comprising a plurality of ridges generally extending transversely therefrom for interengaging with the plurality of reliefs of the primary ratcheting member;
   a first force bearing member coupled between the shaft and the corresponding ratcheting member for urging the corresponding ratcheting member in a first rotary direction; and
   a second force bearing member disposed between the cavity of the housing and a portion of the base portion of the primary ratcheting member for biasing the plurality of reliefs of the base portion against the plurality of ridges of the corresponding ratcheting member,
   wherein when the reliefs of the primary ratcheting member and the ridges of the corresponding ratcheting member are interengaged therebetween, the reliefs and ridges are configured to allow rotation of the corresponding ratcheting member in the first rotary direction but prevent rotation of the corresponding ratcheting member in a second rotary direction generally opposite the first rotary direction, and wherein actuating an end of the shaft against the bias of the second force bearing member provides for disengaging the plurality of reliefs of the base portion from the plurality of ridges of the corresponding ratcheting member to allow for rotation of the corresponding ratcheting member in the second rotary direction.

2. The ratcheting system of claim 1, wherein said corresponding ratcheting member contains a reel for allowing cable to be wrapped thereon, wherein the cable can be wound onto the reel or unwound from the reel into and out of said housing.

3. The ratcheting system of claim 1, wherein said primary ratcheting member retains the capacity to move in an oscillatory motion with respect to the housing and the corresponding ratcheting member.

4. The ratcheting system of claim 1, wherein said first force bearing member is a spiral, power, torsion or constant force spring.

5. The ratcheting system of claim 1, wherein said corresponding ratcheting member comprises a cavity for receiving at least a portion of said first force bearing member, the cavity comprising attachment points formed in at least a portion of the cavity.

6. The ratcheting system of claim 1, wherein the second force bearing member is a coil spring.

7. A method for providing continual rotary motion in one rotary direction while retaining the ability to control rotary motion in the opposite direction, comprising:
   providing a first force bearing spring member for causing rotary motion of a first rotary member in a first rotary direction relative to a second member, the rotary motion being provided on an axis of rotation;
   providing a second force bearing spring member for urging the second member against the first rotary member to cause the first rotary member and the second member to interengage, the first rotary member and second member comprising complementary teeth, wherein the interengagement between the teeth is provided on a plane perpendicular to the axis of rotation, and wherein the teeth are configured such that the first rotary member is capable of rotation in a second rotary direction but prevented from rotation in a second rotary direction;
   providing a release member in the form of a rod-like member coupled to at least a portion of the second member for separating the second member from the first rotary member against the bias of the second force bearing spring member such that the first rotary member is capable of rotation in the first and second rotary directions; and
   providing an interlocking mechanism for preventing the second member from rotating in the first and second rotary directions but permitting axial movement of the second member along the axis of rotation, the interlocking mechanism comprising a first interlocking shape and a second interlocking shape, wherein the first interlocking shape is provided within a housing member that receives the first rotary member and the second member, wherein the first interlocking shape is formed along an interior periphery of the housing, wherein the second interlocking shape is provided on a periphery portion of the second member, the second interlocking shape adapted and configured for interlocking with the first interlocking shape, and wherein the interengagement between the teeth of the first rotary member and the second member in combination with the interlocking between the first and second interlocking shapes prevents the first rotary member to rotate along the axis of rotation in the second rotary direction when a force is being applied to the first rotary member in the second rotary direction.

8. A ratcheting system, comprising:
   a housing comprising a cavity having a first interlocking shape defined therein, the first interlocking shape formed along an interior periphery portion of the cavity;
   a primary ratcheting member comprising a base portion and a shaft generally extending transversely therefrom, the base portion comprising a plurality of reliefs generally extending transversely from the base portion, wherein an outer periphery of the base portion comprises a second interlocking shape for interlocking with the first interlocking shape of the housing, wherein the base portion is adapted and configured for fitting within the cavity of the housing such that the first and second interlocking shapes interengage therewith to prevent rotation therebetween; and a corresponding ratcheting member rotatably mounted to the shaft of the primary ratcheting member, the corresponding ratcheting member comprising a first side and a second side, the first side comprising a plurality of ridges generally extending transversely therefrom for interengaging with the plurality of reliefs of the primary ratcheting member.

9. The ratcheting system of claim 8, further comprising a first force bearing member coupled between the shaft and the corresponding ratcheting member for urging the corresponding ratcheting member in a first rotary direction.

10. A ratcheting system of claim 9, wherein the first force bearing member is a spiral, power, torsion or constant force spring.

11. The ratcheting system of claim 8, further comprising a second force bearing member disposed between the cavity of the housing and a portion of the base portion of the primary ratcheting member for biasing the plurality of reliefs of the base portion against the plurality of ridges of the corresponding ratcheting member.

12. The ratcheting system of claim 11, wherein the second force bearing member is a coil spring.

13. The ratcheting system of claim 8, wherein when the plurality of reliefs of the primary ratcheting member and the plurality of ridges of the corresponding ratcheting member are interengaged therebetween, the teeth are configured to allow rotation of the corresponding ratcheting member in the first rotary direction but prevent rotation of the corresponding ratcheting member in a second rotary direction generally opposite the first rotary direction.

14. The ratcheting system of claim 8, wherein the interengagement between the plurality of ridges of the corresponding ratcheting member and the plurality of reliefs of the primary ratcheting member in combination with the interengagement between the first and second interlocking shapes prevents the corresponding ratcheting member to rotate in the second rotary direction when a force is being applied to the corresponding ratcheting member in the second rotary direction.

15. The ratcheting system of claim 14, wherein the corresponding ratcheting member comprises a reel for allowing cable to be wrapped thereon, wherein the cable can be wound onto the reel or unwound from the reel into and out of said housing.

16. The ratcheting system of claim 14, wherein the force being applied to the corresponding ratcheting member in the second rotary direction is caused by the cable being pulled out of the housing, whereby the cable is prevented from being unwound from the reel by interengagement between the ridges and reliefs of the corresponding and the primary ratcheting member, respectively, in combination with the interengagement between the first and second interlocking shapes.

17. The ratcheting system of claim 8, wherein actuating an end of the shaft against the bias of the second force bearing member provides for disengaging the plurality of reliefs of the base portion from the plurality of ridges of the corresponding ratcheting member to allow for rotation of the corresponding ratcheting member in the second rotary direction.

18. A ratcheting system of claim 8, wherein the primary ratcheting member retains the capacity to move in an oscillatory motion with respect to the housing and the corresponding ratcheting member.

19. The ratcheting system of claim 8, wherein said corresponding ratcheting member comprises a cavity for receiving at least a portion of the first force bearing member, the cavity comprising attachment points formed in at least a portion of the cavity.

20. A ratchet comprising:
a housing comprising a cavity having a first interlocking shape defined therein, the first interlocking shape formed along an interior periphery portion of the cavity;
a primary ratcheting member comprising a base portion and a shaft generally extending transversely therefrom, the base portion comprising a plurality of reliefs generally extending transversely from the base portion, wherein an outer periphery of the base portion comprises a second interlocking shape for interlocking with the first interlocking shape of the housing, wherein the base portion is adapted and configured for fitting within the cavity of the housing such that the first and second interlocking shapes interengage therewith to prevent rotation therebetween; and
a corresponding ratcheting member rotatably mounted to the shaft of the primary ratcheting member, the corresponding ratcheting member comprising a first side and a second side, the first side comprising a plurality of ridges generally extending transversely therefrom for interengaging with the plurality of reliefs of the primary ratcheting member,
wherein rotation of the corresponding ratcheting member in at least one of a first or a second rotary direction is prevented by interengagement between the reliefs of the primary ratcheting member and the ridges of the corresponding ratcheting member in addition to the interengagement between the first and second interlocking shapes.

* * * * *